(12) United States Patent
Schneider et al.

(10) Patent No.: US 8,769,291 B2
(45) Date of Patent: Jul. 1, 2014

(54) CERTIFICATE GENERATION FOR A NETWORK APPLIANCE

(75) Inventors: James P. Schneider, Raleigh, NC (US); Luke R. Meyer, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 1672 days.

(21) Appl. No.: 11/880,806

(22) Filed: Jul. 23, 2007

(65) Prior Publication Data

US 2009/0031410 A1    Jan. 29, 2009

(51) Int. Cl.
*H04L 29/06* (2006.01)

(52) U.S. Cl.
USPC .......................................... 713/175

(58) Field of Classification Search
USPC .................. 713/175, 155, 156, 191
See application file for complete search history.

(56) References Cited

U.S. PATENT DOCUMENTS

| | | | |
|---|---|---|---|
| 5,872,966 A | 2/1999 | Burg | |
| 6,144,965 A | 11/2000 | Oliver | |
| 6,212,563 B1 | 4/2001 | Beser | |
| 6,721,733 B2 | 4/2004 | Lipson et al. | |
| 6,847,959 B1 | 1/2005 | Arrouye et al. | |
| 6,996,832 B2 | 2/2006 | Gunduc et al. | |
| 7,003,527 B1 | 2/2006 | Lavallee et al. | |
| 7,254,814 B1 | 8/2007 | Cormier et al. | |
| 7,509,638 B2 | 3/2009 | Backhouse et al. | |
| 7,568,095 B2 | 7/2009 | Thornton et al. | |
| 7,650,397 B2 | 1/2010 | Price et al. | |
| 7,673,143 B1 | 3/2010 | Yeager et al. | |
| 7,707,405 B1 * | 4/2010 | Gilman et al. ............. | 713/156 |
| 2001/0028647 A1 | 10/2001 | Teraoka | |
| 2002/0116453 A1 | 8/2002 | Todorov et al. | |
| 2003/0037237 A1 | 2/2003 | Abgrall et al. | |
| 2003/0158957 A1 | 8/2003 | Abdolsalehi | |
| 2004/0068586 A1 | 4/2004 | Xie et al. | |
| 2004/0093499 A1 * | 5/2004 | Arditi et al. ............. | 713/176 |
| 2004/0148185 A1 | 7/2004 | Sadiq | |
| 2005/0033794 A1 | 2/2005 | Aridor et al. | |
| 2005/0071630 A1 * | 3/2005 | Thornton et al. ............. | 713/156 |
| 2005/0125411 A1 | 6/2005 | Kilian et al. | |
| 2005/0235352 A1 | 10/2005 | Staats et al. | |
| 2005/0289084 A1 * | 12/2005 | Thayer et al. ............. | 705/67 |
| 2006/0004689 A1 | 1/2006 | Chandrasekaran et al. | |
| 2006/0059111 A1 | 3/2006 | Tucker et al. | |
| 2006/0074975 A1 | 4/2006 | Tunar et al. | |
| 2007/0074119 A1 | 3/2007 | Komine et al. | |
| 2007/0100965 A1 | 5/2007 | Schweier | |
| 2008/0004887 A1 | 1/2008 | Brunswig et al. | |
| 2008/0022103 A1 | 1/2008 | Brown et al. | |
| 2008/0071796 A1 | 3/2008 | Ghuneim et al. | |

(Continued)

OTHER PUBLICATIONS

Red Hat, Inc. "Red Hat Command Center: Users Guide 3.18", 2007, 318 pages.

(Continued)

*Primary Examiner* — Edward Zee (74) *Attorney, Agent, or Firm* — Lowenstein Sandler LLP (57) ABSTRACT

A method and system for generating identity certificates. The method may include receiving a user request to activate a network appliance, and causing a network appliance identifier and a transaction identifier of an activation transaction associated with the user request to be transmitted to the network appliance. A certificate signing request (CSR) and the transaction identifier may be received from the network appliance, the CSR including the network appliance identifier. A certificate may be generated for the network appliance if the activation transaction is valid.

13 Claims, 7 Drawing Sheets

(56) References Cited

U.S. PATENT DOCUMENTS

| | | |
|---|---|---|
| 2008/0092234 A1 | 4/2008 | Circenis |
| 2008/0114770 A1 | 5/2008 | Chen et al. |
| 2008/0189651 A1 | 8/2008 | Reveman |
| 2008/0235710 A1 | 9/2008 | Challenger et al. |
| 2008/0307508 A1 | 12/2008 | Conley et al. |
| 2009/0031410 A1 | 1/2009 | Schneider et al. |
| 2009/0064127 A1 | 3/2009 | Schneider |
| 2009/0100512 A1 | 4/2009 | Schneider |
| 2009/0132681 A1 | 5/2009 | Schneider |
| 2009/0138946 A1 | 5/2009 | Schneider et al. |
| 2009/0138947 A1 | 5/2009 | Schneider et al. |
| 2009/0144399 A1 | 6/2009 | Schneider |

OTHER PUBLICATIONS

Red Hat, Inc. "Red Hat Command Center 3.18: Check Reference", 2007, 178 pages.
Red Hat, Inc. "Red Hat Command Center 3.18: Setup and Installation Guide", 2007, 33 pages.
Red Hat, Inc. "Red Hat Command Center 3.18: Release Notes", 2007, 7 pages.
Office Action of U.S. Appl. No. 11/985,669 mailed Apr. 1, 2010.
Office Action of U.S. Appl. No. 11/985,669 mailed Sep. 29, 2009.
Office Action of U.S. Appl. No. 11/998,098 mailed Mar. 24, 2011.
Office Action of U.S. Appl. No. 11/998,097 mailed Mar. 24, 2011.
Dubash, Manek, techworld.com, Yahoo News, PC World.com, Red Hat posts Command Center, May 29, 2007, 1 pages.
Red Hat, Red Hat Command Center: Easy effective, affordable systems monitoring, www.redhat.com, 2007, 2 pages.
Woods, Will. "git://git.fedorahosted.org/snake/committdiff", http://git.fedorahosted.org/git/snake?p;=snake;a=committdiff;h=a2cb4fcae9531e22d2fa3d . . . Aug. 22, 2007, 2 pages.

* cited by examiner

CERTIFICATE GENERATION FOR A NETWORK APPLIANCE

TECHNICAL FIELD

Embodiments of the present invention relate to authentication mechanisms for network devices, and more specifically to generation of identity certificates for network devices and activation of network appliances.

BACKGROUND

Networked computers are used to transmit and fetch information to and from local sources (e.g., computers used in a business) and remote sources (e.g., enterprise services offered over the internet). To ensure privacy and security during communication between networked computers, authentication and verification mechanisms may be used. One such mechanism is a public key infrastructure system, in which networked devices use signed identity certificates for authentication and/or verification purposes.

In public key infrastructure systems, a certificate signing request (CSR) is a message sent from an applicant to a certificate authority in order to apply for a signed identity certificate. Before creating a CSR, the applicant first generates a key pair (including a public key and a private key), keeping the private key secret. The CSR contains information identifying the applicant (such as a distinguished name of the subject in the case of an X.509 certificate), and the public key generated by the applicant. The identifying information is commonly entered manually by a user. In conventional systems, the CSR is also accompanied by credentials or proofs of identity. Moreover, the certificate authority may contact the applicant for further information. If the request is successful (e.g., if the identifying information, credentials and proofs of identity are satisfactory), the certificate authority will send back an identity certificate (also known as a digital certificate, signed certificate, public key certificate, etc.) that has been digitally signed with the private key of the certificate authority. This identity certificate may thereafter be used by the applicant to authenticate and/or verify itself to networked devices that trust the certificate authority.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for generating identity certificates with minimal user input. In one embodiment, a user request to activate a network appliance is received. The request may include an Internet Protocol (IP) address of the network appliance. In response, a unique network appliance identifier and a transaction identifier of an activation transaction associated with the user request is transmitted to the network appliance (directly or via an intermediary client device). The network appliance may automatically generate a certificate signing request (CSR) upon receipt of the network appliance identifier and/or transaction identifier that may include the network appliance identifier. In one embodiment, the network appliance identifier is a distinguished name of the network appliance. An identity certificate may be generated for the network appliance if the activation transaction is valid (e.g., has not expired). The identity certificate may be transmitted to, and stored at, the network appliance.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "generating" or "calculating" or "determining" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The description that follows details a system, apparatus, and method for generating identity certificates for devices with minimal user input. Such identity certificates may be generated without a user providing or knowing information about the device (such as configuration information, credential information of the device, identifying information of the device, etc.). Therefore, the device may be activated, configured and/or authenticated by a user without the user having any technical expertise. In one embodiment, to initiate generation of the identity certificate, a user may input a location (e.g., a local IP address) of the device. Alternatively, an identity certificate may be generated without user input of the device location. The automated nature of the activation, configuration and authentication in embodiments of the present invention may reduce the occurrence of user error in setting up a network appliance.

Figure 1A:
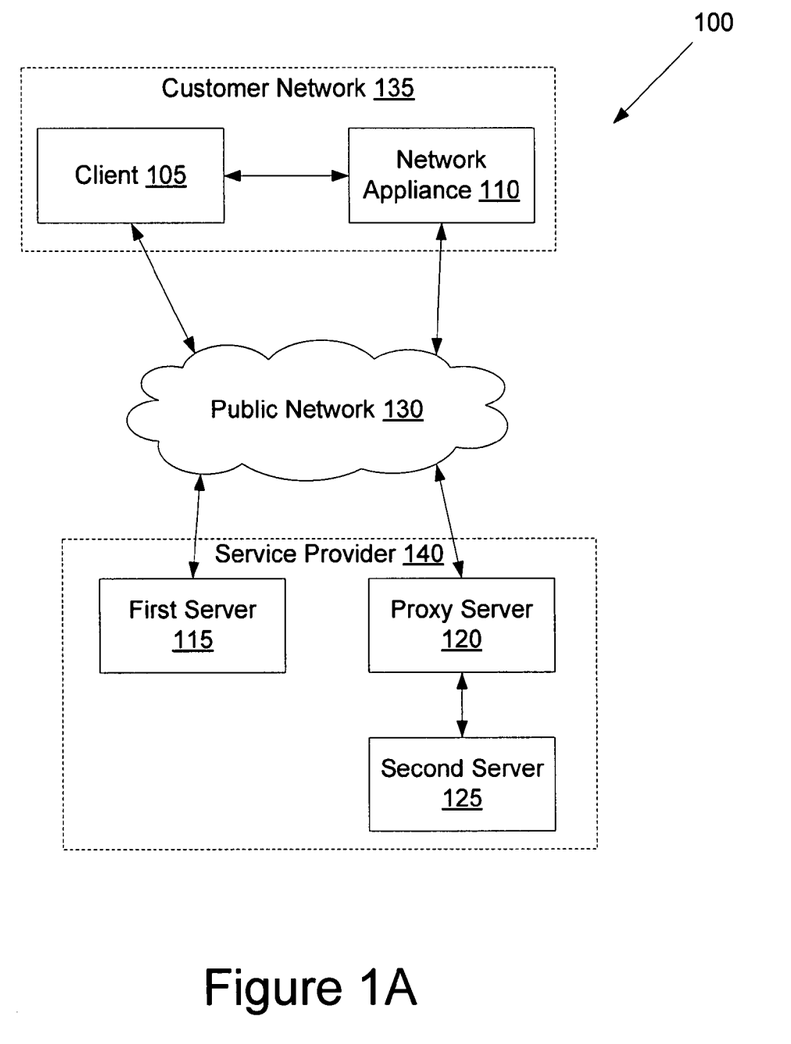
FIG. 1A illustrates an exemplary network architecture in which embodiments of the present invention may operate.

FIG. 1A illustrates an exemplary network architecture 100 in which embodiments of the present invention may operate. The network architecture 100 may include a service provider 140 connected with a customer network 135 (e.g., a local area network (LAN), wide area network (WAN), intranet, etc.) over a public network 130 (e.g., the internet). Alternatively, the customer network 135 may be connected with the service provider 140 via a private network (e.g., an intranet, virtual private network (VPN), etc.).

Network architecture 100 may enable service provider 140 to provide services targeted to, and/or dependent on, specific devices (e.g., network appliance 110) of customer network 135. To provide such services, it may be necessary for the specific device to authenticate itself to service provider 140. Such authentication may be achieved using an identity certificate. In one embodiment, the identity certificate is generated as part of activating and/or configuring a new device. Alternatively, generation of the identity certificate may occur separate from device activation and configuration.

Referring to FIG. 1A, the customer network 135 may represent a network of an enterprise and may include such devices as desktop computers, laptop computers, network printers, switches, routers, gateways, firewalls, or any other devices having a network address. In one embodiment, the customer network 135 also includes a client 105 and a network appliance 110. Client 105 may be a device operated by an IT administrator or some other user. The network appliance 110 may be a computing device that is configurable over a network. In other embodiments, the customer network 135 may include different combinations of clients, network appliances, switches, routers, gateways, etc.

The client 105 and the network appliance 110 may each be a computing device such as, for example, a desktop computer, laptop computer, server, etc. In one embodiment, the network appliance 110 is configured to perform a network related function (e.g., network monitoring) upon connection with the customer network 135. In a further embodiment, the network related function is automatically initiated once the network appliance receives an identity certificate and/or configuration information. In one embodiment, a user request for activation of network appliance 110, for the identity certificate and/or for configuration information may originate from the client 105. Alternatively, requests for activation, for the identity certificate (e.g., a CSR) and/or for configuration information may automatically be generated by the network appliance 110.

The devices included in customer network 135 (e.g., client 105 and network appliance 110) may be grouped into clusters (not shown). Each cluster may integrate the resources of included devices to perform one or more tasks. Clusters may be grouped based on device configuration, physical location, device type, etc. Clusters may be identified by a unique cluster identification number. If customer network 135 is not divided into multiple clusters, then all devices on customer network 135 may share a single cluster identification number.

Service provider 140 provides one or more services to customer network 135. In one embodiment, service provider 140 hosts a network and systems management and monitoring tool (NSMMT) that collects information about the customer network 135 and devices on the customer network 135, and presents this information to a user such as an IT administrator (e.g., via client 105). Alternatively, the service provider 140 may provide other services, such as banking services, database management services, etc. The service provider 140 includes one or more servers (e.g., first server 115, proxy server 120, and second server 125). In one embodiment, the service provider 140 includes a separate and distinct first server 115, proxy server 120 and second server 125. In another embodiment, the first server 115 and second server 125 are co-located on a computing device, and no proxy server 120 is present. Alternatively, other server configurations may be implemented (e.g., service provider 140 may include more or fewer servers, which may have redundant or different functionality).

First server 115 may be a front end server that provides an interface to client 105 of customer network 135. Through the first server 115, users of customer network 135 may request data, initiate actions, receive information, etc. Network appliance 110 may also communicate with first server 115, for example, to request a service, initiate an action, report data, etc. In one embodiment, first server 115 is a web application server that provides a web application interface accessible to client 105 via a web browser.

Second server 125 may be a back end server that communicates with the network appliance 110 of customer network 135 to send and/or receive such data as identity certificate information, network status updates, transactions, etc. Second server 125 may also communicate data to and/or from client 105. In one embodiment, second server 125 communicates with the network appliance 110 and/or client 105 through proxy server 120. Proxy server 120 receives transmissions and, if appropriate, forwards them to second server 125. Alternatively, no proxy server 120 may be present, or multiple proxy servers may be used.

Figure 1B:
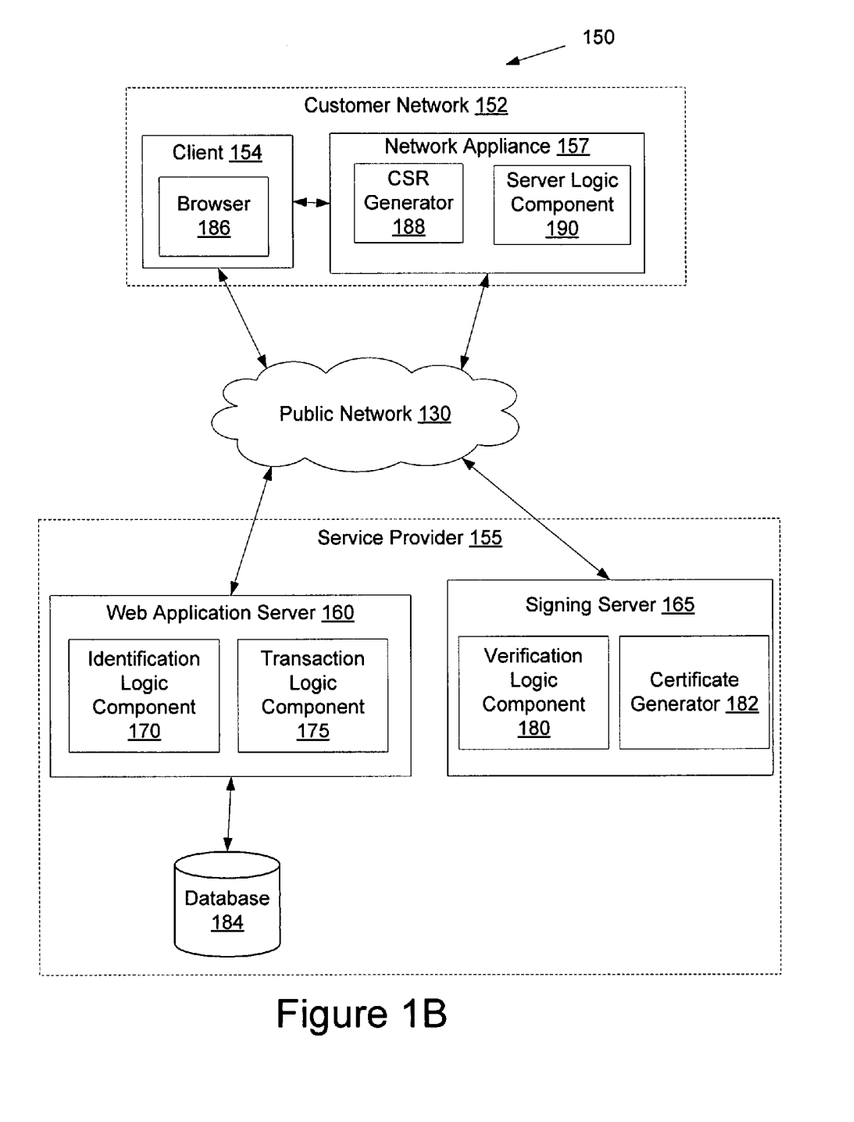
FIG. 1B illustrates another exemplary network architecture, in which further embodiments of the present invention may operate.

FIG. 1B illustrates another exemplary network architecture 150, in which further embodiments of the present invention may operate. The network architecture 150 may include a service provider 155 connected with a customer network 152 over a public network 130 (e.g., the internet) or a private network (not shown).

The customer network 152 may include a client 154 and a network appliance 157. Alternatively, the customer network 152 may include different combinations of clients, network appliances, switches, routers, gateways, etc.

The client 154 and the network appliance 157 may each be a computing device such as, for example, a desktop computer, laptop computer, server, etc. In one embodiment, client 154 hosts a browser 186. Browser 186 is an application that enables client 154 to display and interact with text, images, and other information provided by web application server 160 of service provider 155, by server logic component 190 of network appliance 157, and/or by other servers. Browser 125 may be a web browser configured to display web pages (e.g., by using hypertext transfer protocol (HTTP), extended markup language (XML), javascript, etc.).

Network appliance 157 may include a certificate signing request (CSR) generator 188 and a server logic component 190. Server logic component 190 may be a server application that resides on network appliance 157. Server logic component 190 may receive requests (e.g., for web pages, for specified information, to initiate an action, etc.), provide data, and/or perform other server functions. In one embodiment, server logic component 190 presents data in a form navigable by browser 186.

CSR generator 188 may generate a CSR automatically upon receiving a message from server logic component 190, service provider 140 and/or client 154. The received message may include a directive to generate the CSR using information contained in the message. In one embodiment, the CSR generator 188 generates the CSR automatically without user input (e.g., of the distinguished name, credential information, etc.). Alternatively, the CSR may be generated according to user input.

Generation of a CSR may include generating a public key pair that includes a related public key and private key. Data encrypted with the public key can only be decrypted by the private key, and data encrypted with the private key can only be decrypted with the public key. The public key may be bundled with additional information such as credential information, information about the network appliance, a distinguished name, etc. The bundle may then be signed by the private key, and sent to a certificate authority (e.g., signing server 165 of service provider 155).

Service provider 155 may include a web application server 160, a signing server 165, and a database 184. In one embodiment, web application server 160 includes an identification logic component 170 and a transaction logic component 175.

Identification logic component 170 obtains identifiers for devices, clusters, customer networks, etc. Such identifiers may be obtained, for example, when web application server 160 receives a user request to activate network appliance 157. For example, identification logic component 170 may obtain an identifier for network appliance 157 when a request to activate network appliance 157 is received from client 154. Identification logic component 170 may obtain a single network appliance identifier for a device (e.g., network appliance 157) in response to an activation request. Alternatively, identification logic component 170 may obtain multiple identifiers that together make up a network appliance identifier that uniquely identifies the device. In one embodiment, identification logic component 170 obtains a device identifier (device ID) and a cluster identifier (cluster ID) for a device that is to be activated. The cluster ID may be a value (e.g., numeric, alphanumeric, etc.) that uniquely identifies a cluster to which the requested device belongs. The device ID may be a value that is not shared by any other device in the cluster.

In one embodiment, devices on different clusters may share the same device ID. Therefore, no two clusters may share the same cluster ID, but devices on different clusters may have the same device ID. Alternatively, each device may be assigned a unique device ID.

In one embodiment, the identification logic component 170 generates identifiers of devices and clusters. Alternatively, identification logic component 170 may communicate with database 184 to receive an unused identifier (e.g., an unused device ID and/or cluster ID).

Database 184 may maintain a record of all identifiers that have been assigned to devices. Database 184 may also maintain a record of identifiers that have not been assigned to a device. Such an unassigned identifier may be transmitted to the identification logic component 170 when a device is to be activated.

Transaction logic component 175 generates transaction identifiers. Such transaction identifiers may be generated, for example, when web application server 160 receives a user request to activate network appliance 157. Generated transaction identifiers may include a transaction token that uniquely identifies a particular transaction. In one embodiment, the transaction token includes a random value. In a further embodiment, the transaction token may include the device ID and/or cluster ID, a transaction expiration (e.g., of time), and/or additional information. Generated transaction identifiers may also include a timestamp that specifies when the transaction was initiated and/or when the transaction will expire. Transaction identifiers may be used at one or more stages in the activation of network device 157.

Signing server 165 may be a back end server that provides identity certificates. Signing server 165 may act as a certificate authority (CA), and provide identity certificates that can be used to authenticate devices (e.g., network appliance 157). In one embodiment, certificates provided by signing server 165 are used to authenticate network appliances to servers that trust signing server 165. In one embodiment, signing server 165 includes a verification logic component 180 and a certificate generator 182.

Certificate generator 182 signs certificate signing requests (CSRs) to generate identity certificates. Before a certificate is generated, verification logic component 180 verifies that a received CSR should be signed. Such a verification may include comparing a transaction identifier (e.g., transaction token and/or timestamp) to a CSR, comparing the transaction identifier to a list of valid transaction identifiers, etc. For example, verification may include making sure that a transaction time limit has not expired, or that data in the transaction identifier matches data in the CSR. In one embodiment, a challenge is generated and transmitted to an originator of the CSR. If a successful response is received in response to the challenge, the certificate may be generated. If any one of the verification mechanisms fails, the certificate may not be generated.

Figure 2A:
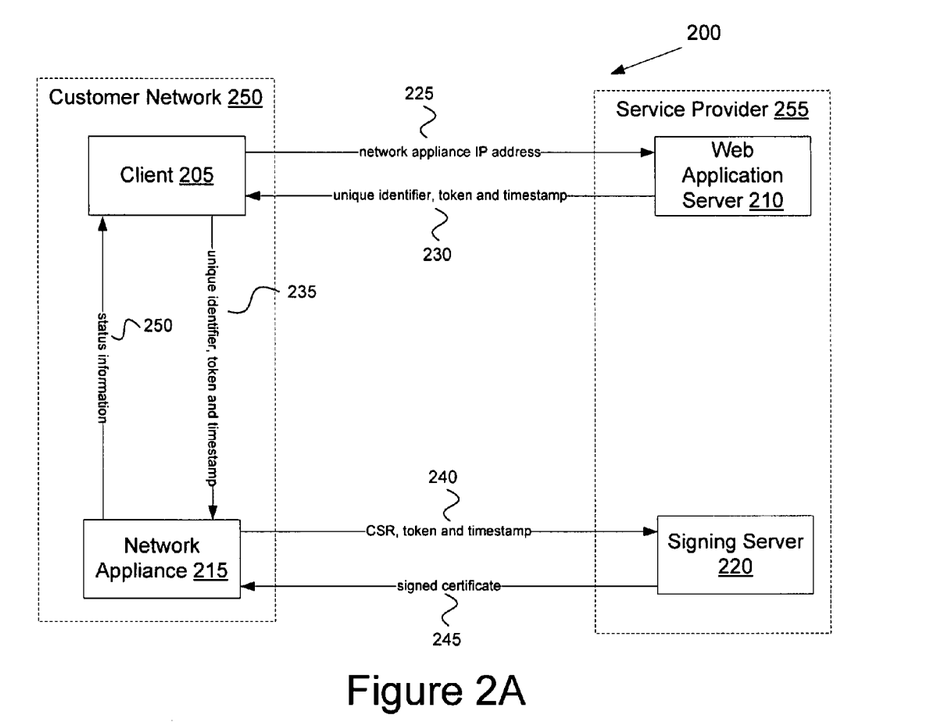
FIG. 2A illustrates a data flow diagram that shows data transmitted between a customer network and a service provider, in accordance with one embodiment of the present invention.

FIG. 2A illustrates a data flow diagram 200 that shows data transmitted between a customer network 250 and a service provider 255, in accordance with one embodiment of the present invention. Preferably each transmission is achieved using a secure channel such as, for example, secure sockets layer (SSL), secure hypertext transfer protocol (HTTPS), etc. Alternatively, an unsecure channel may be used for transmission of, for example, an identity certificate. In one embodiment, the customer network 250 and service provider 255 correspond to customer network 135 and service provider 140 of FIG. 1A. In another embodiment, customer network 250 and service provider 255 correspond to customer network 152 and service provider 155 of FIG. 1B.

Referring to FIG. 2A, in a first transmission 225 client 205 may send a user request to activate network appliance 215 to web application server 210. The first transmission 225 may include a location of the network appliance 215, such as a network appliance IP address. The network appliance IP address may have been assigned by a network administrator when the network appliance was connected with the customer network 152. Alternatively, the network appliance IP address may have been automatically assigned (e.g., by server logic component 190, or by a device on the customer network 152). In one embodiment, the location (e.g., IP address) is transmitted to the web application server 210 via a form field of a web page. Alternatively, the user request may be sent via email, ftp, telnet, or another transmission medium. In one embodiment, the user request is sent subsequent to the client 205 logging into web application server 210.

In response to receiving the user request, web application server 210 may generate a network appliance identifier and a transaction identifier for a transaction associated with the user request. Web application server 210 may then send a second transmission 230 to client 205 that includes the network appliance identifier and the transaction identifier. The second transmission 230 may also include a directive to generate a CSR. In one embodiment, the transaction identifier includes a transaction token and a timestamp. In another embodiment, the transaction identifier includes a cookie (also known as a web cookie and an HTTP cookie). In one embodiment, the second transmission 230 is sent by a web page redirect that redirects client 205 to request a web page from network appliance 215.

Upon receipt of the second transmission 230, client 205 may automatically send a third transmission 235 to network appliance 215 that includes the network appliance identifier and the transaction identifier (e.g., token and timestamp). The third transmission 235 may also include the directive to generate a CSR. In one embodiment, the third transmission 235 is a request for a web page from network appliance 215 based on the redirect from web application server 210. The request for the web page may include the network appliance identifier, the transaction identifier and/or the directive to generate the CSR.

Upon receipt of the third transmission 235, network appliance 215 may automatically generate a CSR that includes the network appliance identifier in accordance with the directive, the network appliance identifier and/or the transaction identifier. In one embodiment, the network appliance identifier is included in a distinguished name associated with the CSR. Once the CSR is generated, network appliance 215 may send a fourth transmission 240 to signing server 220 that includes the CSR and the transaction identifier. Alternatively, the fourth transmission 240 may be sent to a proxy server (not shown) that forwards the transmission to signing server 220. Network appliance 215 may then wait for a response from the signing server 220 that includes an identity certificate, or monitor a location for a posting of the identity certificate.

Signing server 220 may analyze the CSR to determine whether it is genuine, and thus whether an identity certificate should be generated. Such an analysis may include comparing the CSR to the transaction identifier, sending a challenge to the network appliance 215 using a public key included in the CSR, comparing the transaction identifier to a list of valid transaction identifiers, etc. If the CSR is genuine, signing server may generate an identity certificate for network appliance 215.

Once an identity certificate is generated (and signed), signing server 220 may send a fifth transmission 245 to network appliance 215 that includes the identity certificate. Alternatively, signing server 220 may post the identity certificate to a location monitored by network appliance 215. The network appliance 215 may then detect and download the identity certificate. Network appliance 215 may store the identity certificate, and may thereafter use the identity certificate to authenticate itself to one or more servers of service provider 255.

A sixth transmission 250 may then be sent from network appliance 215 to client 205 including status information. The status information may inform client 205 whether the network appliance 215 has been successfully activated and/or whether an identity certificate was successfully installed. In one embodiment, the sixth transmission 250 is a web page redirect that redirects the client 205 to a web page of web application server 210. If the certificate was successfully installed, then the redirect may be a redirect to a web page stating that the network appliance 215 was successfully activated. If the certificate was not successfully installed, then the redirect may be a redirect to a web page stating that an error occurred in activation of the network appliance 215.

Figure 2B:
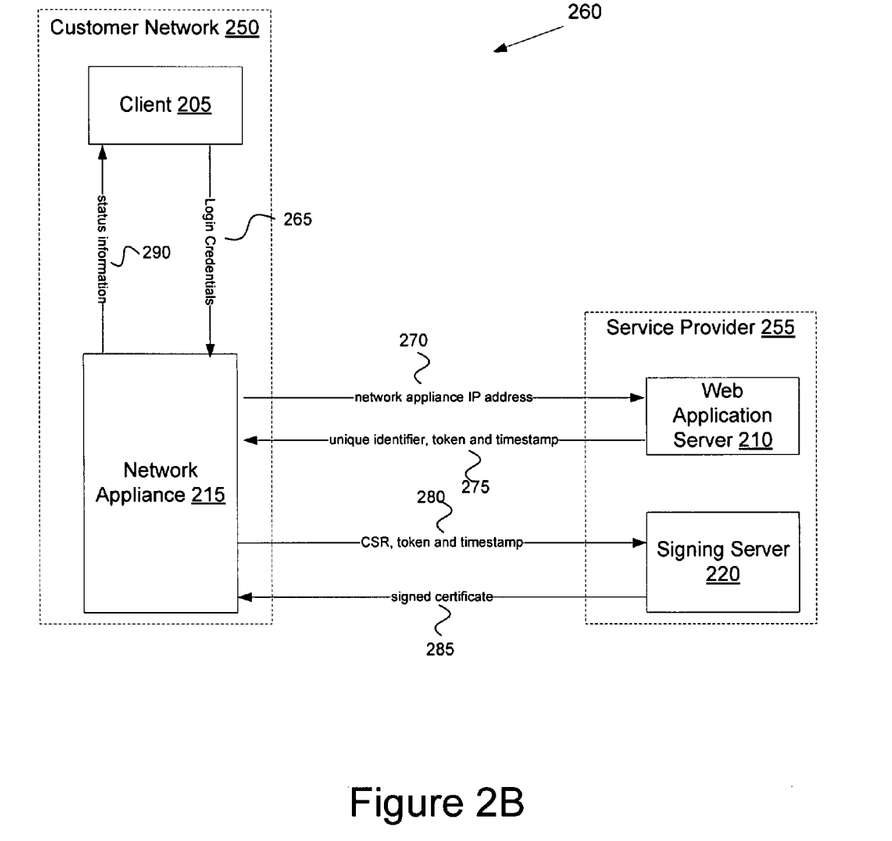
FIG. 2B illustrates a data flow diagram that shows data transmitted between a customer network and a service provider, in accordance with another embodiment of the present invention.

FIG. 2B illustrates a data flow diagram 260 that shows data transmitted between a customer network 250 and a service provider 255, in accordance with another embodiment of the present invention. In one embodiment, the customer network 250 and service provider 255 correspond to customer network 135 and service provider 140 of FIG. 1A. In another embodiment, customer network 250 and service provider 255 correspond to customer network 152 and service provider 155 of FIG. 1B.

Referring to FIG. 2B, in a first transmission 265 client 205 may attempt to login to network appliance 215. The first transmission 265 may include login credentials (e.g., user name and password). In a second transmission 270, network appliance 215 may send an activation request including login credentials to web application server 210. Second transmission 270 may be sent automatically in response to a successful login by client 205.

In response to receiving the activation request, web application server 210 may generate a network appliance identifier and a transaction identifier for a transaction associated with the activation request. Web application server 210 may then send a third transmission 275 to client 205 that includes the network appliance identifier and the transaction identifier. The third transmission 275 may also include a directive to generate a CSR.

Upon receipt of the third transmission 235, network appliance 215 may automatically generate a CSR that includes the network appliance identifier in accordance with the directive, the network appliance identifier and/or the transaction identifier. In one embodiment, the network appliance identifier is included in a distinguished name associated with the CSR. Once the CSR is generated, network appliance 215 may send a fourth transmission 280 to signing server 220 that includes the CSR and the transaction identifier. Alternatively, the fourth transmission 280 may be sent to a proxy server (not shown) that forwards the transmission to signing server 220. Network appliance 215 may then wait for a response from the signing server 220 that includes an identity certificate, or monitor a location for a posting of the identity certificate.

Signing server 220 may analyze the CSR to determine whether it is genuine, and thus whether an identity certificate should be generated. Such an analysis may include comparing the CSR to the transaction identifier, sending a challenge to the network appliance 215 using a public key included in the CSR, comparing the transaction identifier to a list of valid transaction identifiers, etc. If the CSR is genuine, signing server may generate an identity certificate for network appliance 215.

Once an identity certificate is generated (and signed), signing server 220 may send a fifth transmission 285 to network appliance 215 that includes the identity certificate. Alternatively, signing server 220 may post the identity certificate to a location monitored by network appliance 215. The network appliance 215 may then detect and download the identity certificate. Network appliance 215 may store the identity certificate, and may thereafter use the identity certificate to authenticate itself to one or more servers of service provider 255.

A sixth transmission 290 may then be sent from network appliance 215 to client 205 including status information. The status information may inform client 205 whether the network appliance 215 has been successfully activated and/or whether an identity certificate was successfully installed.

Figure 3:
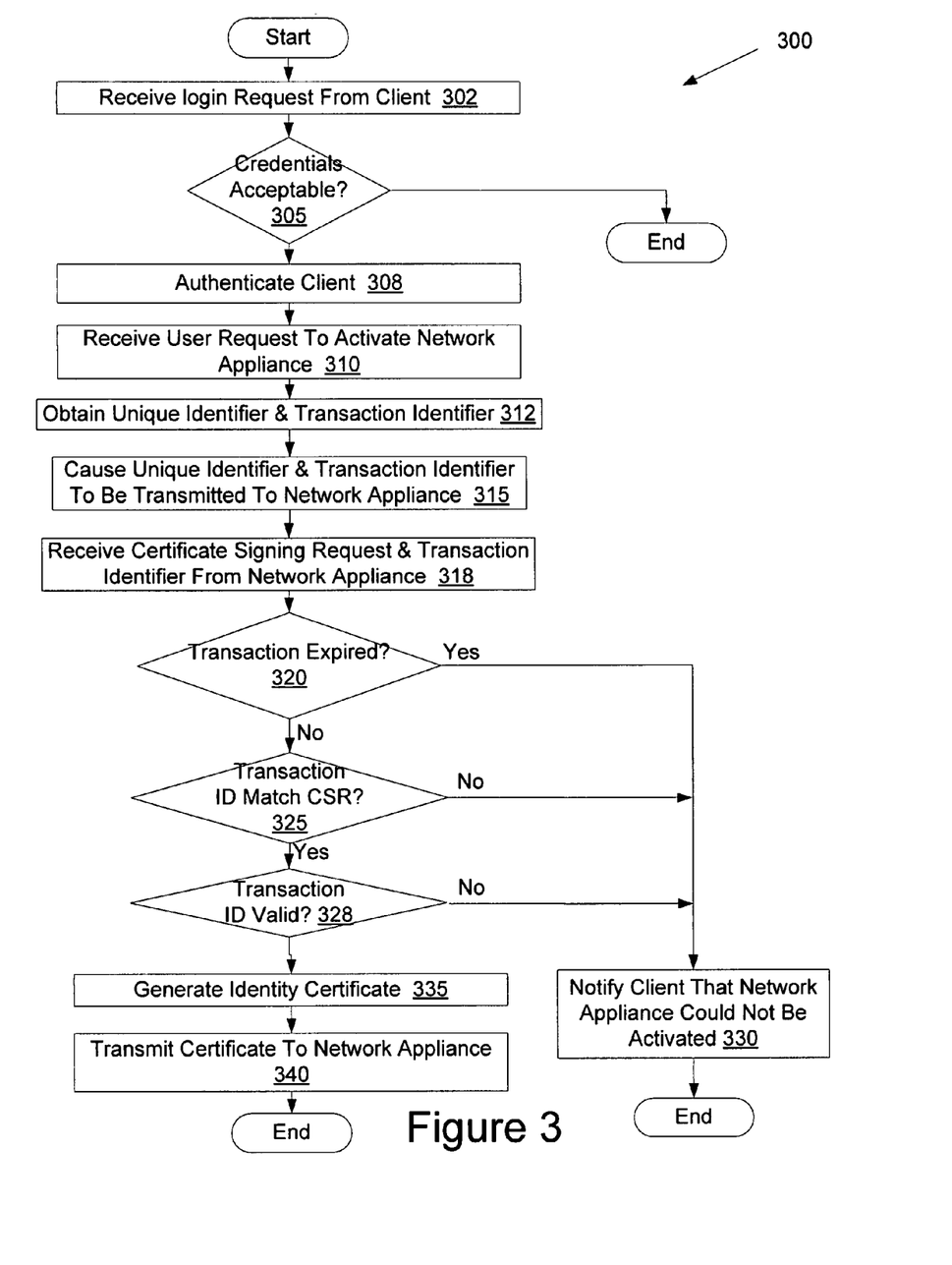
FIG. 3 is a flow diagram illustrating one embodiment of a method for activating a network appliance.

FIG. 3 is a flow diagram illustrating one embodiment of a method 300 for activating a network appliance. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a service provider, such as service provider 140 of FIG. 1A, service provider 155 of FIG. 1B, or service provider 255 of FIG. 2.

Referring to FIG. 3, method 300 begins with processing logic receiving a login request from a client (block 302). At block 305, processing logic determines whether acceptable credentials or authentication information (e.g., a user name and password) have been provided by the client. If the login request is accompanied by acceptable credentials or authentication information, then the method proceeds to block 308, and the client is authenticated. If no credentials were provided, or if unacceptable credentials were provided, then the method ends.

At block 310, a user request to activate a network appliance is received. The user request may or may not include identifying information about the network appliance (e.g., a MAC address), configuration information (e.g., information on any state associated with the network appliance that it needs to function), or credential information for the network appliance.

In one embodiment, the user request may include a location of the network appliance. Thereby, a response to the request may be directed to the network appliance using the provided location information. In one embodiment, the location of the network appliance includes a local IP address that is not globally valid (e.g., an IP address that begins with "10." or "192.168." that can only be accessed from a local area network)). In another embodiment, the request includes a globally valid IP address (e.g., an IP address that can be accessed globally).

In an alternative embodiment, a response may be directed to the network appliance without the location having been provided in the user request. For example, the network appliance may be automatically assigned an IP address (e.g., one of a small set of known IP addresses). The assigned IP address may be a default IP address of an unconfigured network appliance. The assigned IP address may be known to the processing logic, and therefore no IP address needs to be provided. In another example, a communication directed from the web application server to the network appliance may be sent to multiple devices on a customer network. Only the network appliance may understand, and therefore respond to, the communication.

At block 312, a network appliance identifier and a transaction identifier of a transaction associated with the user request are obtained. In one embodiment, the network appliance identifier includes a cluster ID and a device ID. In a further embodiment, the transaction identifier includes a transaction token and a timestamp. In one embodiment, the network appliance identifier and transaction identifier are both generated by processing logic. Alternatively, one or both of the network appliance identifier and the transaction identifier may be received from a database (e.g., a database that maintains a listing of assigned and unassigned device IDs and cluster IDs).

At block 315, processing logic causes the network appliance identifier and the transaction identifier to be transmitted to the network appliance. In one embodiment, the network appliance identifier and transaction identifier are transmitted to the client such that the network appliance identifier and transaction identifier are automatically directed to the network appliance (e.g., via a web page redirect). Alternatively, the network appliance identifier and the transaction identifier may be transmitted directly to the network appliance.

At block 318, a certificate signing request (CSR) and the transaction identifier are received from the network appliance. The CSR may have been automatically generated by the network appliance upon receipt by the network appliance of the network appliance identifier and/or of the transaction identifier.

At block 320, processing logic compares the CSR to the transaction identifier. If the transaction has expired (e.g., a timestamp and/or a transaction token indicate that a time limit for the transaction has expired), the method proceeds to block 330. If the transaction has not expired, the method proceeds to block 325.

At block 325, processing logic determines whether data within the transaction identifier matches data within the CSR. In one embodiment, the network appliance identifier (e.g., device ID and cluster ID) included in the CSR are compared to a copy of the network appliance identifier included in the transaction identifier. If the data in the transaction identifier matches the data in the CSR, the method proceeds to block 328. Otherwise, the method proceeds to block 330.

At block 328, processing logic determines whether the transaction identifier is valid. The transaction identifier may be valid if it matches a stored transaction identifier. In one embodiment, known valid transaction identifiers are stored in a database. If the transaction identifier is valid, the method proceeds to block 335. If the transaction identifier is not valid, the method proceeds to block 330.

At block 330, the client is notified that the network appliance could not be activated. The method then ends.

At block 335, an identity certificate is generated. At block 340, the identity certificate is then transmitted to the network appliance. Thereafter, the network appliance may authenticate itself using the identity certificate.

Once the identity certificate has been sent to the network appliance, the network appliance may be automatically configured. In one embodiment, configuration information specific to the network appliance is associated with the identity certificate. Therefore, for example, if an update for the network appliance is available, the update may be provided to the network appliance automatically once the network appliance authenticates itself using the identity certificate.

Figure 4:
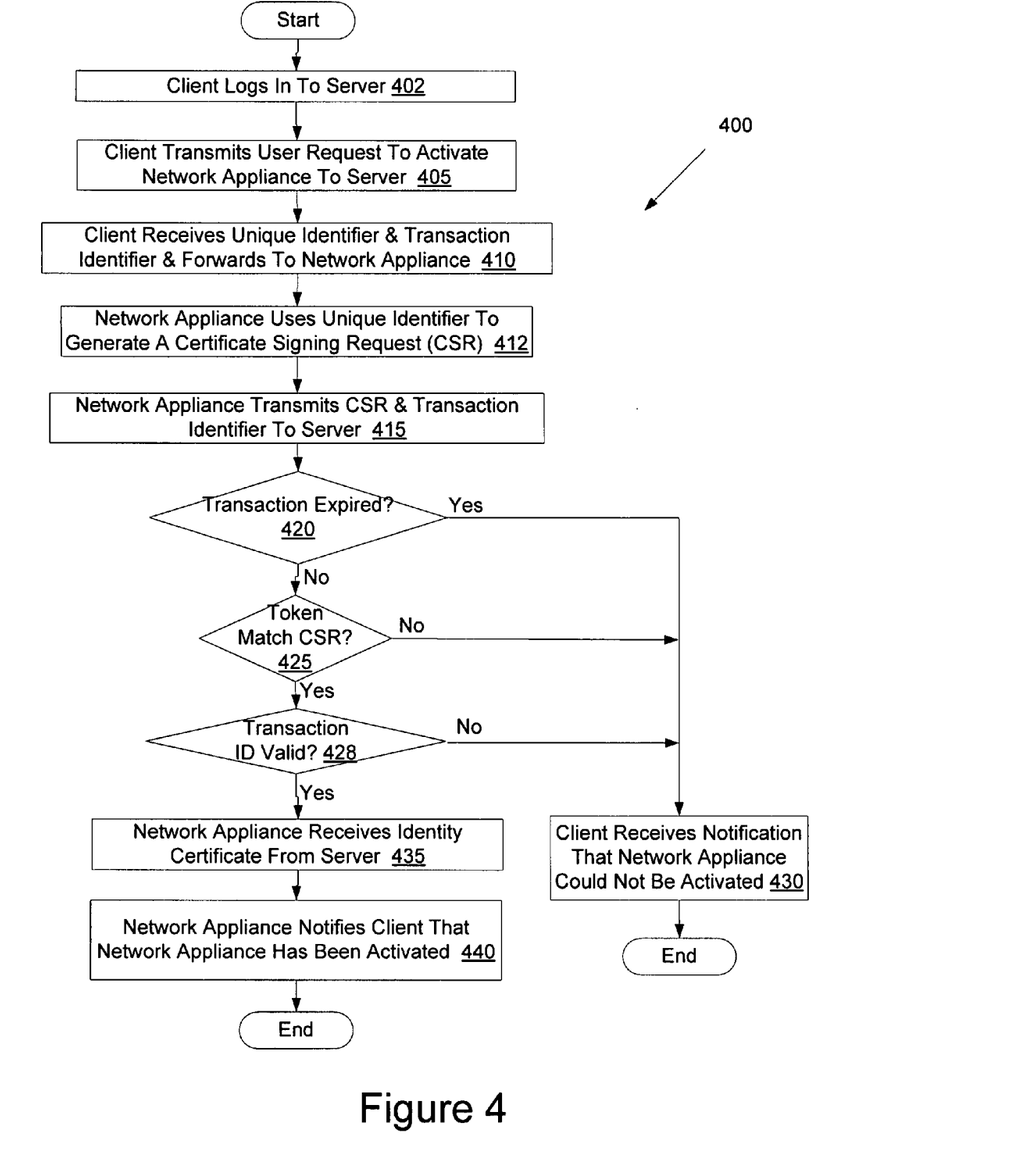
FIG. 4 is a flow diagram illustrating another embodiment of a method for activating a network appliance.

FIG. 4 is a flow diagram illustrating another embodiment of a method 400 for activating a network appliance. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by devices in a customer network, such as customer network 135 of FIG. 1A, customer network 152 of FIG. 1B, or customer network 250 of FIG. 2.

Referring to FIG. 4, method 400 begins with a client logging into a server (block 402). Logging into the server may include providing credentials or authentication information (e.g., a user name and password). At block 405, the client transmits a user request to activate a network appliance to the server. The user request may or may not include identifying information about the network appliance (e.g., a MAC address), configuration information, or credential information for the network appliance. In one embodiment, the user request includes a location of the network appliance. In an alternative embodiment, no location information is included in the user request.

At block 410, a network appliance identifier and a transaction identifier of a transaction associated with the user request are received from the server and automatically forwarded to the network appliance. In one embodiment, the network appliance identifier includes a cluster ID and a device ID. In a further embodiment, the transaction identifier includes a transaction token and a timestamp. In still a further embodiment, a directive to generate a CSR is received by the network appliance along with the transaction identifier and the network appliance identifier.

At block 412, the network appliance uses the network appliance identifier to generate a CSR. The CSR may be automatically generated by the network appliance upon receipt of the network appliance identifier and/or of the transaction identifier. In one embodiment, the CSR is automatically generated in accordance with the received directive.

At block 415, the network appliance transmits the CSR and the transaction identifier to the server. At block 420, if the transaction has expired, the method proceeds to block 430. If the transaction has not expired, the method proceeds to block 425.

At block 425, if data within the transaction identifier matches data within the CSR, the method proceeds to block 428. If the data within the transaction identifier (e.g., copy of the network appliance identifier) does not match the data within the CSR, the method proceeds to block 430.

At block 428, if the transaction identifier is valid, the method proceeds to block 435. If the transaction identifier is not valid, the method proceeds to block 430. At block 430, the client and/or the network appliance receive a notification that the network appliance could not be activated. The notification may include an indication of why the network appliance could not be activated (e.g., time limit expired, CSR failed to match transaction identifier, etc.).

At block 435, the network appliance receives an identity certificate from the server. At block 440, the network appliance notifies the client that the network appliance has been successfully activated. The notification may include a redirect to a web page of the server.

Figure 5:
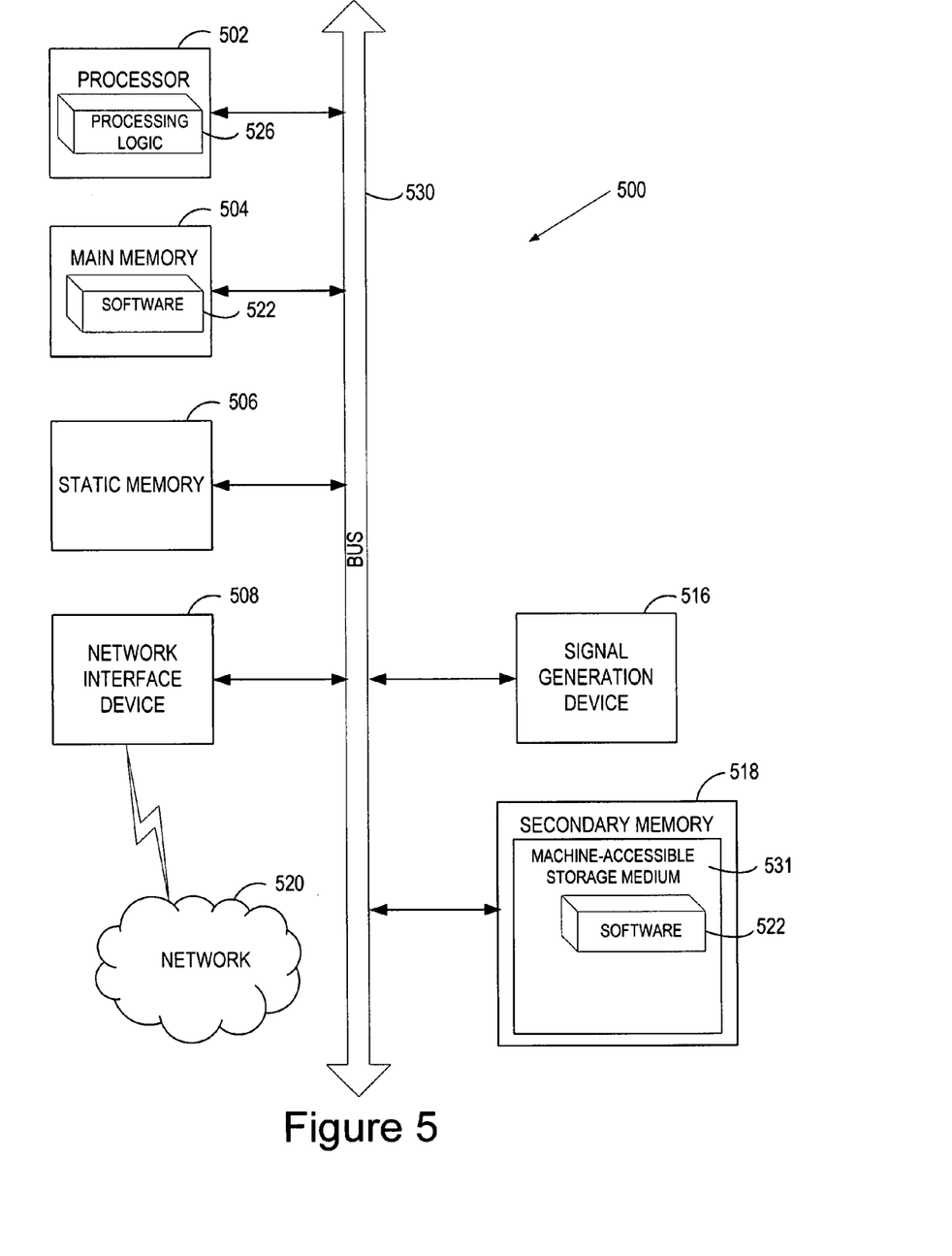
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, a front end server 115, a back end server 125, a client 105, a network appliance 110, or any other computing device.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM RDRAM), etc.), and a static memory 506 (e.g., flash memory, static random access memory (SRAM), etc.), which may communicate with each other via a bus 530. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device 502 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute processing logic 526 for performing the operations and steps discussed herein.

The computer system 500 may further include a network interface device 508 and/or a signal generation device 516. It also may or may not include a video display unit (e.g., a liquid crystal display (LCD) or a cathode ray tube (CRT)), an alphanumeric input device (e.g., a keyboard), and/or a cursor control device (e.g., a mouse).

The computer system 500 may or may not include a secondary memory 518 (e.g., a data storage device) having a machine-accessible storage medium 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
receiving from a client, by a processing device, a user request to activate a network appliance;
transmitting, by the processing device, a network appliance identifier and a transaction identifier which uniquely identifies an activation transaction associated with the user request, wherein the network appliance identifier and the transaction identifier are received by the client and by the network appliance;
receiving, by the processing device, a certificate signing request (CSR) and the transaction identifier from the network appliance, the CSR comprising the network appliance identifier; and
generating, by the processing device, a certificate for the network appliance when the activation transaction is valid.

2. The method of claim 1, wherein the user request does not specify identifying information about the network appliance, configuration information, or credential information for the network appliance.

3. The method of claim 1, wherein the certificate signing request is generated by the network appliance in response to the network appliance receiving the network appliance identifier.

4. The method of claim 1, wherein the user request comprises a network address of the network appliance.

5. A non-transitory machine-accessible storage medium including instructions that, when executed by a first machine, cause the first machine to perform operations comprising:
receiving from a client, by a first processor of the first machine, a user request to activate a network appliance;
transmitting, by the first processor, a network appliance identifier and a transaction identifier which uniquely identifies an activation transaction associated with the user request, wherein the network appliance identifier and the transaction identifier are received by the client and by the network appliance;
receiving, by the first processor, a certificate signing request (CSR) and the transaction identifier from the network appliance, the certificate signing request comprising the network appliance identifier; and
generating, by the first processor, a certificate for the network appliance when the activation transaction is valid.

6. The non-transitory machine-accessible storage medium of claim 5, wherein the user request does not specify identifying information about the network appliance, configuration information, or credential information for the network appliance.

7. The non-transitory machine-accessible storage medium of claim 5, wherein the user request comprises a network address of the network appliance.

8. The non-transitory machine-accessible storage medium of claim 5, further including instructions that, when executed by a second machine, cause the second machine to perform operations comprising:
transmitting, by a second processor of the second machine, the user request from a client to a server;
receiving, by the second processor, the network appliance identifier and the transaction identifier at the network appliance;
transmitting, by the second processor, the CSR and the transaction identifier from the network appliance to the server; and
receiving, by the second processor, the certificate from the server at the network appliance when the activation transaction is valid.

9. The non-transitory machine-accessible storage medium of claim 8, further including instructions that, when executed by the network appliance, cause the network appliance to perform operations comprising:
generating the certificate signing request by the network appliance upon receipt of the network appliance identifier.

10. An apparatus comprising:
a network interface device; and
a processing device, coupled to the network interface device, to:
receive from a client, via the network interface device, a user request to activate a network appliance,
transmit, via the network interface device, a network appliance identifier and a transaction identifier which uniquely identifies an activation transaction associated with the user request, wherein the network appliance identifier and the transaction identifier are received by the client and by the network appliance,
receive, via the network interface device, a certificate signing request (CSR) and the transaction identifier from the network appliance, the CSR comprising the network appliance identifier, and
generate a certificate for the network appliance when the activation transaction is valid.

11. The apparatus of claim 10, wherein the user request does not specify identifying information about the network appliance, configuration information, or credential information for the network appliance.

12. The apparatus of claim 10, wherein the certificate signing request is generated by the network appliance in response to the network appliance receiving the network appliance identifier.

13. The apparatus of claim 10, wherein the user request comprises a network address of the network appliance.

* * * * *